(12) United States Patent
Johnson et al.

(10) Patent No.: US 9,003,809 B2
(45) Date of Patent: Apr. 14, 2015

(54) POWER GENERATION SYSTEM AND METHODS FOR MONITORING OPERATION OF SAME

(75) Inventors: Jay Lynn Johnson, Simpsonville, SC (US); Edward Arthur Dewhurst, Niskayuna, NY (US); Charles Scott Sealing, Clifton Park, NY (US); Justin Aden Spade, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 1072 days.

(21) Appl. No.: 13/024,014

(22) Filed: Feb. 9, 2011

(65) Prior Publication Data
US 2012/0198811 A1  Aug. 9, 2012

(51) Int. Cl.
F02C 9/00 (2006.01)
F01K 23/10 (2006.01)
F02C 6/18 (2006.01)

(52) U.S. Cl.
CPC .......... *F02C 9/00* (2013.01); *F01K 23/106* (2013.01); *F02C 6/18* (2013.01); *F05D 2220/72* (2013.01); *F05D 2260/80* (2013.01); *F05D 2270/331* (2013.01)

(58) Field of Classification Search
CPC .......... F01K 23/106; F02C 6/18; F02C 9/00; F05D 2220/72; F05D 2260/80; F05D 2270/331
USPC .......... 60/39.281, 39.182, 773, 793, 39.3, 60/39.55
See application file for complete search history.

(56) References Cited

U.S. PATENT DOCUMENTS

| | | | | |
|---|---|---|---|---|
| 3,422,800 A * | 1/1969 | La Haye | | 122/7 R |
| 3,848,138 A * | 11/1974 | Park | | 290/40 R |
| 3,879,616 A * | 4/1975 | Baker et al. | | 290/40 R |
| 3,979,904 A * | 9/1976 | Hobbs | | 60/790 |
| 4,215,412 A | 7/1980 | Bernier et al. | | |
| 4,314,441 A | 2/1982 | Yannone et al. | | |
| 5,042,246 A * | 8/1991 | Moore et al. | | 60/773 |
| 5,301,499 A * | 4/1994 | Kure-Jensen et al. | | 60/773 |
| 5,555,719 A * | 9/1996 | Rowen et al. | | 60/773 |
| 6,494,045 B2 * | 12/2002 | Rollins, III | | 60/773 |
| 6,582,184 B2 * | 6/2003 | Little, Jr. | | 415/1 |
| 6,880,324 B2 * | 4/2005 | Tanaka | | 60/39.182 |
| 6,898,935 B2 | 5/2005 | Barber et al. | | |
| 7,021,062 B2 * | 4/2006 | Tanaka et al. | | 60/773 |
| 7,134,322 B1 | 11/2006 | Baird | | |
| 7,571,057 B2 | 8/2009 | D'Amato et al. | | |
| 7,635,250 B2 * | 12/2009 | Montgomery et al. | | 415/115 |
| 7,640,748 B2 | 1/2010 | Barber et al. | | |
| 7,788,014 B2 | 8/2010 | Volponi | | |
| 2007/0040335 A1 * | 2/2007 | Kowalczyk | | 277/412 |
| 2009/0238679 A1 * | 9/2009 | Hernandez et al. | | 415/118 |
| 2010/0140529 A1 * | 6/2010 | Ghasripoor et al. | | 251/368 |

* cited by examiner

*Primary Examiner* — William H Rodriguez
*Assistant Examiner* — Carlos A Rivera
(74) *Attorney, Agent, or Firm* — Armstrong Teasdale LLP

(57) ABSTRACT

A method of monitoring a power generation system that includes a steam turbine that is coupled to a gas turbine engine. The method includes calculating, by a control system, a gas turbine engine power output that is based at least in part on a predefined power generation system power output and a predefined steam turbine power output. The power generation system is operated to generate a power output that is approximately equal to the predefined power generation system power output. A signal indicative of a sensed operating power output of the gas turbine engine is transmitted from a sensor to the control system. A condition of the steam turbine is determined based at least in part on the sensed operating gas turbine engine power output and the calculated gas turbine engine power output.

20 Claims, 5 Drawing Sheets

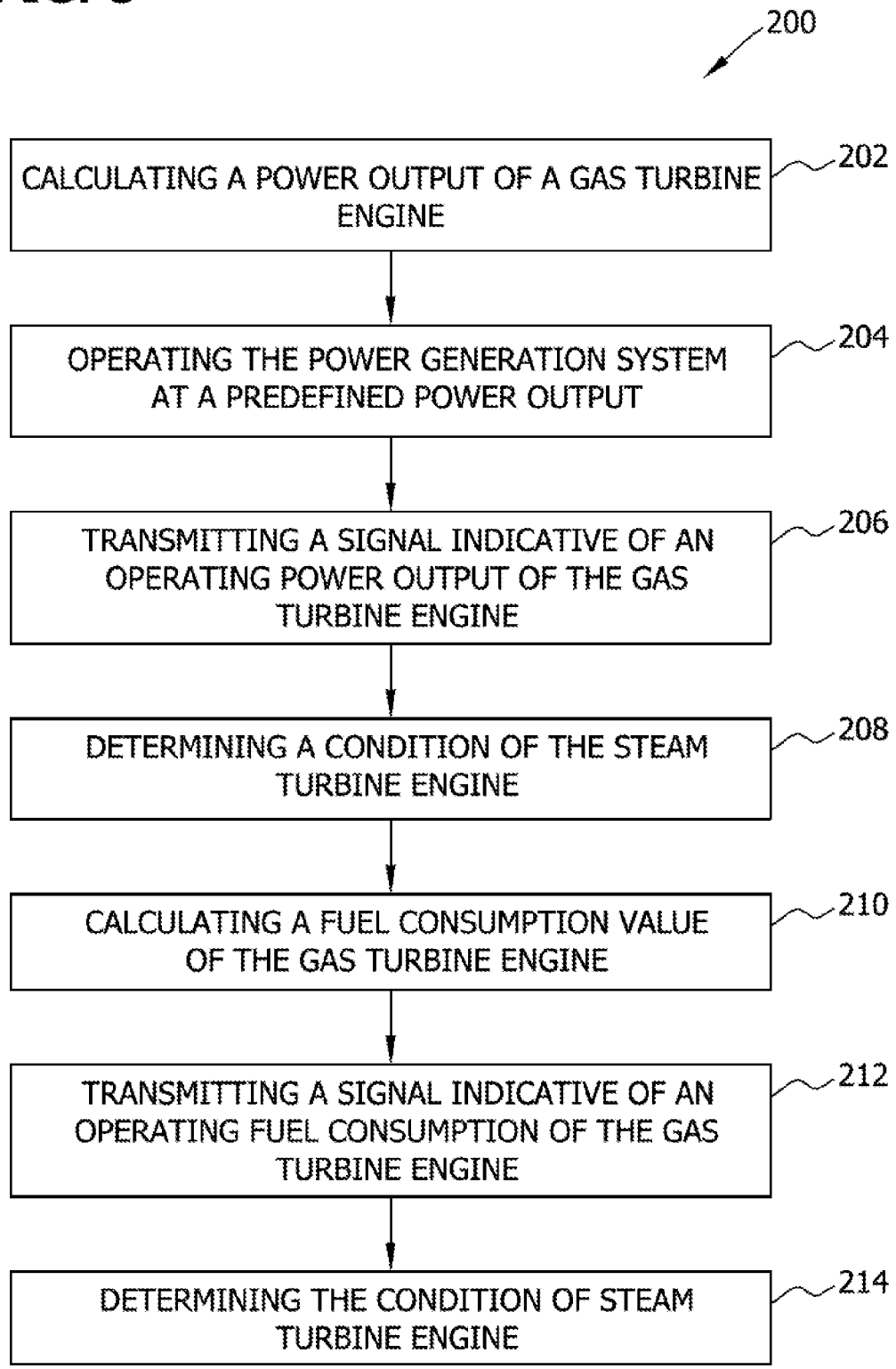

POWER GENERATION SYSTEM AND METHODS FOR MONITORING OPERATION OF SAME

BACKGROUND OF THE INVENTION

The subject matter described herein relates generally to power generation systems and, more particularly, to systems and methods for use in monitoring the operation of the power generation systems.

At least some known power generation systems include a gas turbine engine system and a steam turbine system. Some known steam turbine systems include a multi-stage heat recovery steam generator (HRSG) that uses relatively high grade heat channeled from exhaust gases from a gas turbine engine. The HRSG generates progressively lower grade steam in each successive stage in the exhaust of a gas turbine engine, wherein the steam is channeled from the HRSG to a steam turbine. Known HRSGs are capable of generating relatively high pressure steam in a high pressure portion of the HRSG. After heat is removed from the gas in the high pressure stage, the gas is then channeled to an intermediate pressure stage to generate a lower pressure or intermediate pressure steam.

In at least some known steam turbine systems, steam valves regulate a flow of steam between the HRSG and the steam turbine. Overtime, during operation, the structural integrity of known steam valves may degrade and steam may leak through the control valve. As the amount of leakage increases, the control valve becomes less reliable in regulating the flow of steam from the HRSG to the steam turbine. Testing and inspection of at least some known steam valves require the power generation system be shutdown to enable the steam valves to be removed and manually inspected. However, shutting the power generation system down for manual inspection of valves may be time consuming, expensive, and/or increase the cost of operating the power generation system.

BRIEF DESCRIPTION OF THE INVENTION

In one embodiment, a method of monitoring a power generation system that includes a steam turbine that is coupled to a gas turbine engine is provided. The method includes calculating, by a control system, a gas turbine engine power output that is based at least in part on a predefined power generation system power output and a predefined steam turbine power output. The power generation system is operated to generate a power output that is approximately equal to the predefined power generation system power output. A signal indicative of a sensed operating power output of the gas turbine engine is transmitted from a sensor to the control system. A condition of the steam turbine is determined based at least in part on the sensed operating gas turbine engine power output and the calculated gas turbine engine power output.

In another embodiment, a condition monitoring system for use with a power generation system that includes a steam turbine coupled to a gas turbine engine is provided. The condition monitoring system includes at least one fuel sensor that is configured to sense a fuel consumption of the gas turbine engine. A control system is coupled to the fuel sensor for use in calculating a condition of the steam turbine based at least in part on the sensed fuel consumption of the gas turbine engine.

In yet another embodiment, a power generation system is provided. The power generation system includes a gas turbine engine and a steam turbine that is coupled to the gas turbine engine. At least one fuel sensor is configured to sense a fuel consumption of the gas turbine engine. A control system is coupled to the fuel sensor for use in calculating a condition of the steam turbine based at least in part on the sensed fuel consumption of the gas turbine engine.

BRIEF DESCRIPTION OF THE DRAWINGS

FIG. 5 is a flow chart of an exemplary method that may be used in monitoring the power generation system shown in FIG. 1.

DETAILED DESCRIPTION OF THE INVENTION

The exemplary methods and systems described herein overcome at least some disadvantages of known power generation systems by providing a monitoring system that can enable steam leakage from a steam turbine to be determined while the power generation system remains online. Moreover, the embodiments described herein include a condition monitoring system that determines such steam leakage from the steam turbine based on a fuel consumption of the gas turbine engine. By determining the steam leakage from the steam turbine, the condition monitoring system facilitates preventing conditions such as overspeed of the power generation system that may cause damage to the power generation system. Moreover, by determining a steam leakage while the power generation system is online, the cost of operating the power generation system is facilitated to be reduced.

As used herein, the term "overspeed" refers to a rotational speed of a rotor shaft at which potential damage to the rotor shaft, including damage to the turbine may occur.

Figure 1:
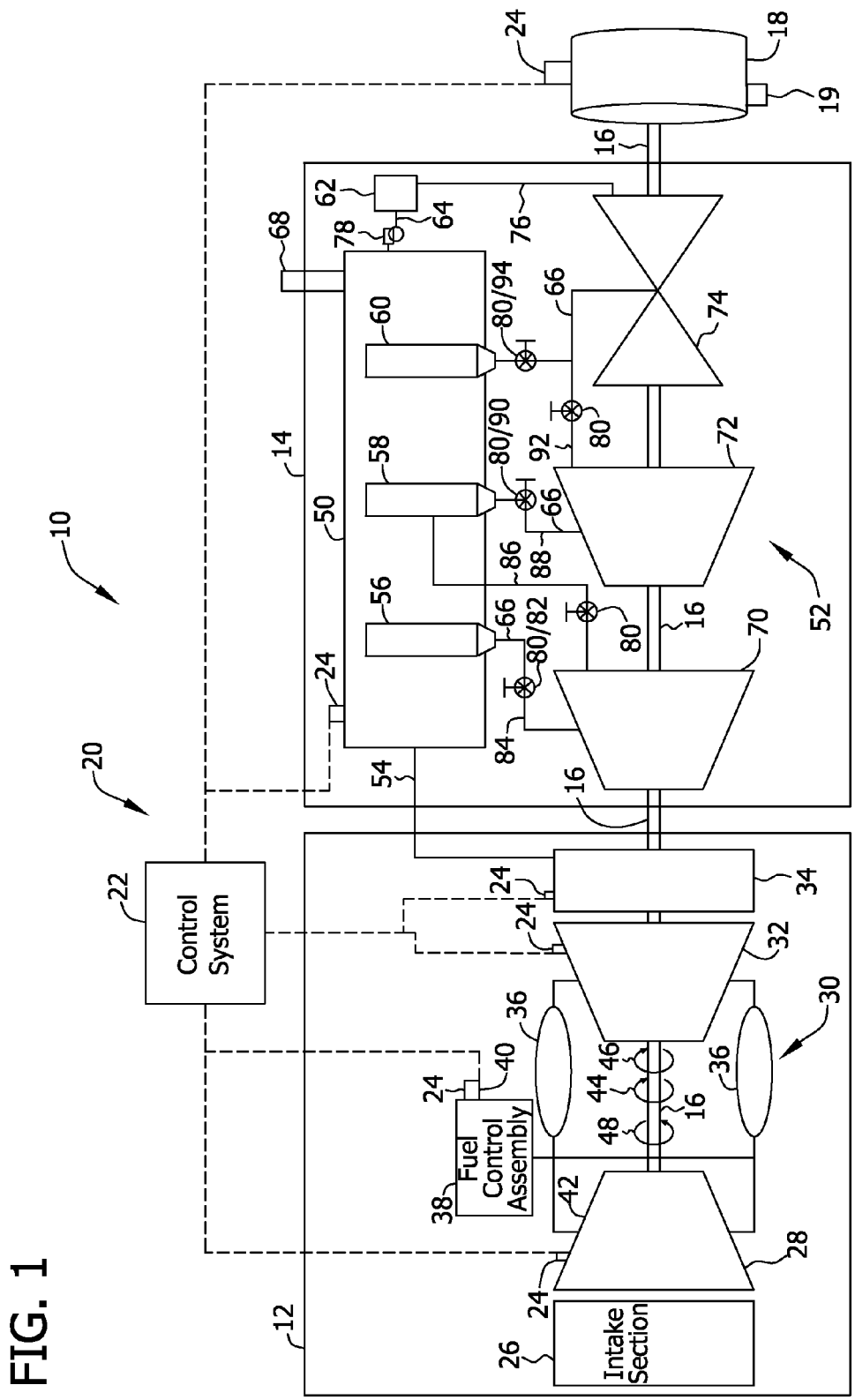
FIG. 1 is a schematic illustration of an exemplary power generation system.

FIG. 1 is a schematic illustration of a power generation system 10. In the exemplary embodiment, power generation system 10 includes a top cycle or gas turbine engine 12 and a bottom cycle or steam turbine 14. Gas turbine engine 12 is coupled to steam turbine 14 via a rotor shaft 16. Rotor shaft 16 is coupled to a generator 18 and transfers mechanical rotational energy from gas turbine engine 12 and steam turbine 14 to generator 18. Generator 18 converts the mechanical energy of gas turbine engine 12 and steam turbine 14 to electrical energy that is used in power production of power generation system 10. Generator 18 includes a generator breaker 19 that is positionable between a closed position and an open position. In the closed position, generator 18 is electrically coupled to a power grid and/or power output source, and breaker 19 imparts a torque loading to rotor shaft 16 to facilitate power production. In the open position, generator 18 is not electrically coupled to the power grid. In an alternative embodiment, gas turbine engine 12 is coupled to generator 18 with a first rotor shaft (not shown), and steam turbine 14 is coupled to generator 18 with a second rotor shaft (not shown), such that each gas turbine engine 12 and steam turbine 14 are each coupled to generator 18 separately.

In the exemplary embodiment, a condition monitoring system 20 is coupled to power generation system 10 for use in monitoring power generation system 10. Condition monitoring system 20 includes a control system 22 that is coupled in communication with a plurality of sensors 24. Each sensor 24 detects various conditions of gas turbine engine 12, steam turbine 14, and/or generator 18. Sensors 24 may include, but are not limited to only including, gas sensors, temperature sensors, flow sensors, speed sensors, power output sensors, valve position sensors, and/or any other sensors that sense various parameters relative to the operation of power generation system 10. As used herein, the term "parameters" refers to physical properties whose values can be used to define the operating conditions of power generation system 10, such as temperatures, pressures, power outputs, and fuel flows at defined locations.

In the exemplary embodiment, gas turbine engine 12 includes an intake section 26, a compressor section 28 that is downstream from intake section 26, a combustor section 30 that is downstream from compressor section 28, a turbine section 32 that is downstream from combustor section 30, and an exhaust section 34 that is coupled to turbine section 32. Turbine section 32 is coupled to compressor section 28 via a rotor shaft 16. Combustor section 30 includes a plurality of combustors 36. Combustor section 30 is coupled to compressor section 28 such that each combustor 36 is in flow communication with compressor section 28. A fuel control assembly 38 coupled to combustor section 30 channels fuel into each combustor 36. At least one fuel sensor 40 is coupled to fuel control assembly 38 for sensing an amount of fuel being channeled to combustor 36 and for transmitting a signal indicative of the sensed fuel consumption of gas turbine engine 12 to control system 22. Turbine section 32 is coupled to compressor section 28 and to generator 18. At least one power sensor 42 is coupled to generator 18 for sensing an amount of power being generated by generator 18 and for transmitting a signal indicative of the sensed power output of generator 18.

During operation, intake section 26 channels air towards compressor section 28 wherein the air is compressed to a higher pressure and temperature prior to being discharged towards combustor section 30. Combustor section 30 mixes the compressed air with fuel, ignites the fuel-air mixture to generate combustion gases that are channeled towards turbine section 32. More specifically, in combustors 36, fuel, for example, natural gas and/or fuel oil, is injected into the air flow, and the resulting fuel-air mixture is ignited to generate high temperature combustion gases that are channeled towards turbine section 32. Turbine section 32 converts thermal energy from the gas stream to mechanical rotational energy as the combustion gases impart rotational energy to turbine section 32 and to rotor shaft 16.

In the exemplary embodiment, turbine section 32 imparts a first torque loading, represented by arrow 44, to rotor shaft 16 that causes rotor shaft 16 to rotate in a rotational direction, represented by arrow 46. During rotation of rotor shaft 16, compressor section 28 generates an aerodynamic drag that imparts a second torque loading, i.e. a compressor drag, represented by arrow 48, in an opposite direction to first torque loading 44. During normal operation, combustor section 30 channels enough combustion gases to turbine section 32 that enable turbine section 32 to impart a first torque loading 44 that is sufficient to overcome compressor drag 48 such that turbine section 32 rotates rotor shaft 16 and compressor section 28.

In the exemplary embodiment, steam turbine 14 includes a heat recovery steam generator (HRSG) 50 and a steam turbine assembly 52 that is coupled to generator 18 via rotor shaft 16. Exhaust gases from gas turbine engine 12 are channeled through a heat transfer line 54 to HRSG 50 for use in recovering waste heat from the exhaust gases. During operation, HRSG 50 channels steam from HRSG 50 towards steam turbine assembly 52. Steam turbine assembly 52 converts the thermal energy from the steam to mechanical rotational energy as the steam imparts rotational energy to steam turbine assembly 52.

HRSG 50, in the exemplary embodiment, includes a high pressure (HP) section 56, an intermediate pressure (IP) section 58, and a low pressure (LP) section 60. Moreover, in the exemplary embodiment, HRSG 50 transfers progressively lower grade heat from exhaust gases to water that is circulated progressively through each section 56, 58, and 60. Each of HP, IP, and LP sections 56, 58, and 60 may include an economizer, an evaporator, a superheater and/or a feedwater heater or other pre-heaters associated with that respective section 56, 58, and 60, such as but not limited to a high pressure section pre-heater, any or all of which may be split into multiple heat exchangers that are positioned in one or more of sections (HP,IP,LP) 56, 58, and/or 60. Condensate is channeled from a condenser assembly 62 to HRSG 50 through a condensate transfer line 64 to generate steam. Heat recovered from the exhaust gases channeled to HRSG 50 is transferred to condensate/steam in HRSG 50 for use in producing steam that is supplied through one or more conduit lines 66 to steam turbine assembly 52. Cooled gases from the HRSG 50 are discharged into the atmosphere via an exit duct 68 and via a stack (not shown).

In the exemplary embodiment, steam turbine assembly 52 includes a high pressure (HP) turbine assembly 70, an intermediate pressure (IP) turbine assembly 72, and a low pressure (LP) turbine assembly 74 coupled together in a serial flow arrangement. In some embodiments, LP turbine assembly 74 may suitably be divided into any number of LP turbine sections (e.g., a dual-flow LP turbine section). In the exemplary embodiment, LP turbine assembly 74 is coupled in flow communication with condenser assembly 62 via at least one exhaust conduit 76. Condenser assembly 62 is coupled in flow communication with HRSG 50 via condensate transfer line 64 to facilitate channeling condensate from condenser assembly 62 to HRSG 50 via any suitable pump 78. A plurality of steam valves 80 are coupled between HRSG 50 and steam turbine assembly 52 to enable a flow of steam to be selectively channeled from HRSG 50 to steam turbine assembly 52. During normal operation of steam turbine assembly 52, each steam valve 80 operates with a predefined range of steam leakage through the steam valve 80, based on structural characteristics of steam valve 80 and HRSG 50. Over time, as steam valve 80 is subjected to general mechanical wear, structural fatigue may develop within steam valve 80 that may cause steam valve 80 to operate with an amount of steam leakage that is outside of the predefined range of acceptable steam leakage.

During operation, exhaust gases from gas turbine engine 12 are channeled through heat transfer line 54 to HRSG 50 for use in heating a working fluid (e.g., a liquid water) flowing within HRSG 50 to produce steam therein. HRSG 50 channels steam to steam turbine assembly 52 via conduit 66 such that the steam is channeled sequentially through HP turbine assembly 70, IP turbine assembly 72, and LP turbine assembly 74 to facilitate driving HP turbine assembly 70, IP turbine assembly 72, and LP turbine assembly 74, respectively, and to enable generator 18 to be actuated via rotor shaft 16. In the exemplary embodiment, an HP control valve 82 enables a flow of steam to be selectively channeled from HP section 56 to HP turbine assembly 70 via an HP steam conduit 84. Steam discharged from HP turbine assembly 70 is channeled from HP turbine assembly 70 to HRSG 50 via a first reheat conduit 86 to be reheated within IP section 58 and channeled from IP section 58 into IP turbine assembly 72 via a second reheat conduit 88. Including at least one such "reheat cycle" facilitates improving an operational efficiency of steam turbine assembly 52. An IP control valve 90 enables a flow of steam to be selectively channeled from IP section 58 to IP turbine assembly 72. IP turbine assembly 72 discharges steam from IP turbine assembly 72 to LP turbine assembly 74 via an IP discharge conduit 92. An LP control valve 94 enables a flow of steam to be selectively channeled from LP section 60 to LP turbine assembly 74.

In the exemplary embodiment, power generation system 10 is selectively operable in a first or normal mode, a second or low forward power mode, and/or a third or shut-down mode. As used herein, the term "normal operation mode" refers to a mode of operation in which gas turbine engine 12 and steam turbine 14 each operate to generate rotational energy of rotor shaft 16 for use by generator 18 in generating electricity. As used herein, the term "low forward power mode" refers to a mode of operation in which steam valves 80 are closed, generator breaker 19 is closed, and wherein gas turbine engine 12 is operated to generate a predefined power output of generator 18. Moreover, as used herein, the term "shut-down mode" refers to a mode of operation in which gas turbine engine 12 and steam turbine 14 are each moved offline and are not in an operating position.

In the exemplary embodiment, the operation of power generation system 10 may be selectively changed from normal operation mode to shut-down mode to prevent an overspeed of rotor shaft 16. During shut-down mode, steam valves 80 are repositioned to a closed position to reduce a flow of steam from HRSG 50 to steam turbine assembly 52 such that compressor drag 48 slows the rotation of rotor shaft 16 to a rotational speed that is below overspeed. If a volume of steam that is greater than the predefined range of steam leakage is channeled through steam valve 80 and/or HRSG 50, steam turbine assembly 52 may generate sufficient rotational energy to overcome compressor drag 48 and cause rotor shaft 16 to rotate to overspeed. In the exemplary embodiment, condition monitoring system 20 monitors steam leakage through steam valve 80 and/or through HRSG 50 and notifies an operator when steam valve 80 and/or HRSG 50 are not operating within a predefined range of steam leakage values.

Figure 2:
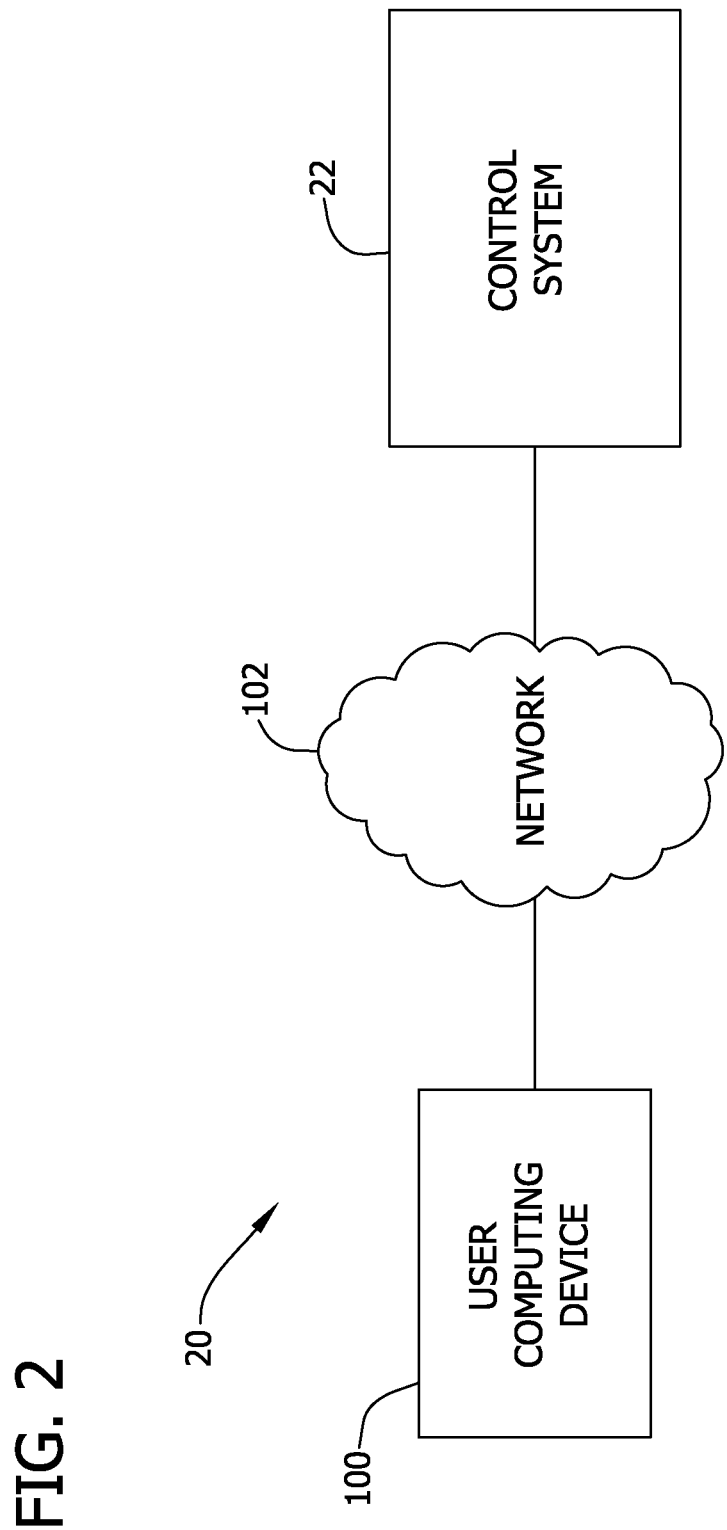
FIG. 2 is a block diagram of an exemplary condition monitoring system that may be used with the power generation system shown in FIG. 1.

FIG. 2 is a block diagram of condition monitoring system 20. In the exemplary embodiment, condition monitoring system 20 includes a user computing device 100 that is coupled to control system 22 via a network 102. Network 102 may include, but is not limited to, the Internet, a local area network (LAN), a wide area network (WAN), a wireless LAN (WLAN), a mesh network, and/or a virtual private network (VPN). User computing device 100 and control system 22 communicate with each other and/or network 102 using a wired network connection (e.g., Ethernet or an optical fiber), a wireless communication means, such as radio frequency (RF), an Institute of Electrical and Electronics Engineers (IEEM 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of Institute of Electrical and Electronics Engineers, Inc., of New York, N.Y.

Figure 3:
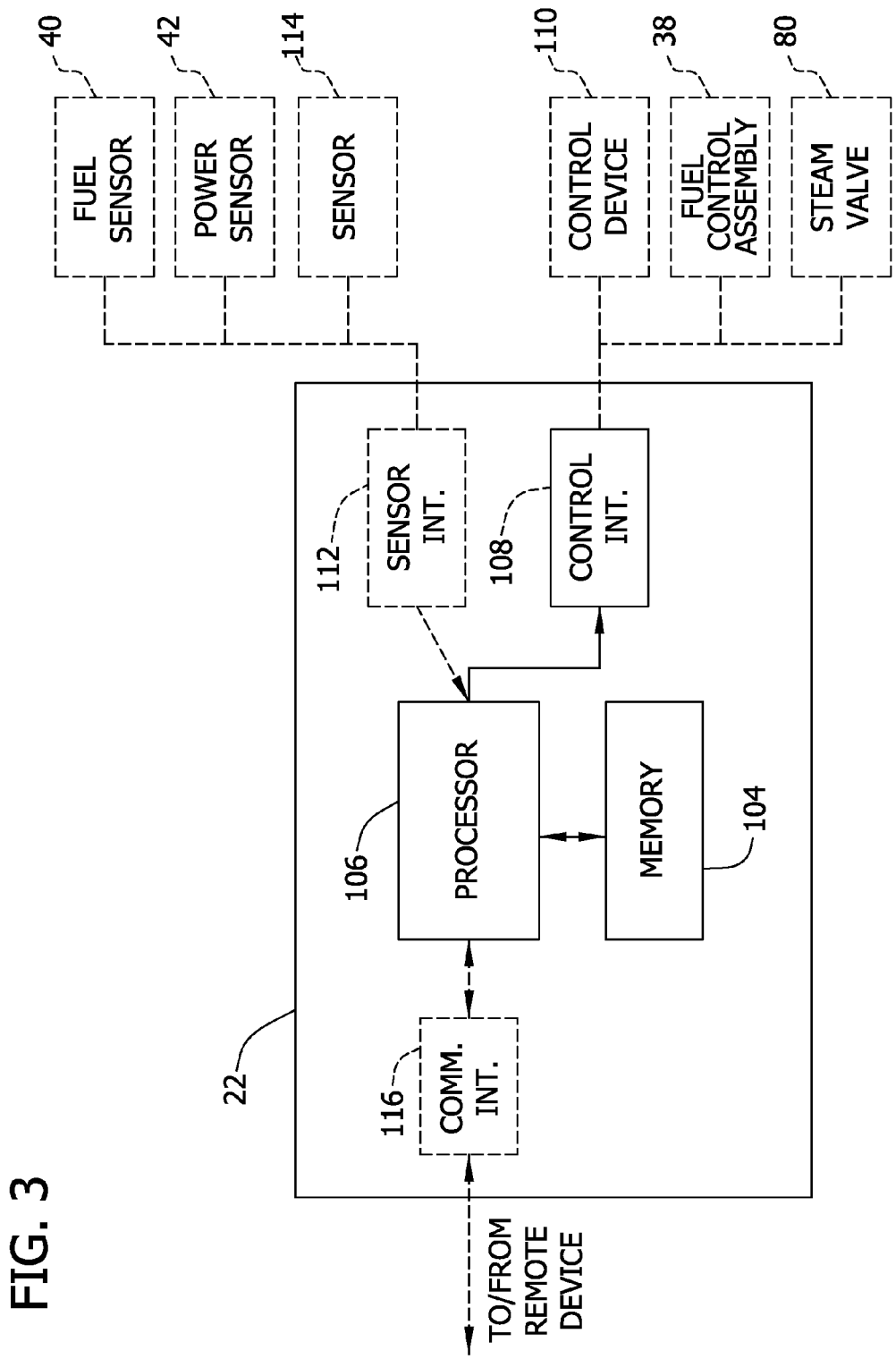
FIG. 3 is a block diagram of an exemplary control system that may be used with the condition monitoring system shown in FIG. 2.

FIG. 3 is a block diagram of control system 22. In the exemplary embodiment, control system 22 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, control system 22 may be a microprocessor that includes read-only memory (ROM) and/or random access memory (RAM), such as, for example, a 32 bit microcomputer with 2 Mbit ROM and 64 Kbit RAM. As used herein, the term "real-time" refers to outcomes occurring in a substantially short period of time after a change in the inputs affect the outcome, with the time period being a design parameter that may be selected based on the importance of the outcome and/or the capability of the system processing the inputs to generate the outcome.

Moreover, control system 22 includes a memory area 104 that stores executable instructions and/or one or more operating parameters representing and/or indicating an operating condition of power generation system 10. Operating parameters may represent and/or indicate, without limitation, a fuel consumption, an overspeed value, a steam leakage, and/or a power output. In one embodiment, memory area 104 stores a predefined range of fuel consumption values and predefined range of power output values that are each received from user computing device 100.

In the exemplary embodiment, control system 22 also includes a processor 106 that is coupled to memory area 104 and that is programmed to calculate a condition of power generation system 10 based at least in part on one or more operating parameters. For example, processor 106 also calculates a condition of power generation system 10 based on the predefined range of fuel consumption values. In one embodiment, processor 106 may include a processing unit, such as, without limitation, an integrated circuit (IC), an application specific integrated circuit (ASIC), a microcomputer, a programmable logic controller (PLC), and/or any other programmable circuit. Alternatively, processor 106 may include multiple processing units (e.g., in a multi-core configuration).

Processor 106 is programmed to calculate a fuel consumption value of gas turbine engine 12 based at least in part on a fuel consumption signal that is received from fuel sensor 40. Processor 106 also compares the calculated fuel consumption value to the predefined fuel consumption value to determine that a condition of power generation system 10 is below the predefined power generation system 10 condition, if the calculated fuel consumption value is different than the predefined fuel consumption value. In one embodiment, processor 106 is programmed to determine that a leakage through steam valve 80 is greater than a predetermined leakage value if the sensed fuel consumption is less than the predefined fuel consumption value.

In the exemplary embodiment, control system 22 also includes a control interface 108 that controls an operation of power generation system 10. In some embodiments, control interface 108 is coupled to one or more power generation control devices 110, such as, for example, fuel control assembly 38 and/or steam valves 80 (shown in FIG. 1).

In the exemplary embodiment, control system 22 includes a sensor interface 112 that is coupled to at least one sensor 114 such as, for example, fuel sensor 40 for receiving signals from sensor 114. Each sensor 114 transmits a signal corresponding to a sensed operating parameter of power generation system 10. Moreover, each sensor 114 may transmit a signal continuously, periodically, or only once, for example, although other signal timings are also contemplated. Furthermore, each sensor 114 may transmit a signal either in an analog form or in a digital form. Control system 22 processes the signal(s) by processor 106 to create one or more operating parameters. In some embodiments, processor 106 is programmed (e.g., with executable instructions in memory area 104) to sample a signal produced by sensor 114. For example, processor 106 may receive a continuous signal from sensor 114 and, in response, periodically (e.g., once every five seconds) calculate a condition of power generation system 10 based on the continuous signal. In some embodiments, processor 106 normalizes a signal received from sensor 114. For example, sensor 114 may produce an analog signal with a parameter (e.g., voltage) that is directly proportional to an operating parameter value. Processor 106 may be programmed to convert the analog signal to the operating parameter. In one embodiment, sensor interface 112 includes an analog-to-digital converter that converts an analog voltage signal generated by sensor 114 to a multi-bit digital signal usable by control system 22.

In addition, control system 22 includes a communication interface 116. Communication interface 116 is coupled in communication with one or more remote devices, such as user computing device 100. Communication interface 116 may transmit an operating parameter and/or a control parameter (e.g., a fuel consumption) to a remote device. For example, communication interface 116 may encode an operating parameter and/or a control parameter in a signal. In addition communication interface 116 receives the operating parameter and/or the control parameter from a remote device and controls an operation of power generation system 10 based at least in part on the received operating parameter and/or control parameter.

Various connections are available between control interface 108 and control device 110, and between sensor interface 112 and sensor 114. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE® 1284 or IEEE® 488, a short-range wireless communication channel such as BLUETOOTH®, and/or a private (e.g., inaccessible outside power generation system 10) network connection, whether wired or wireless.

Figure 4:
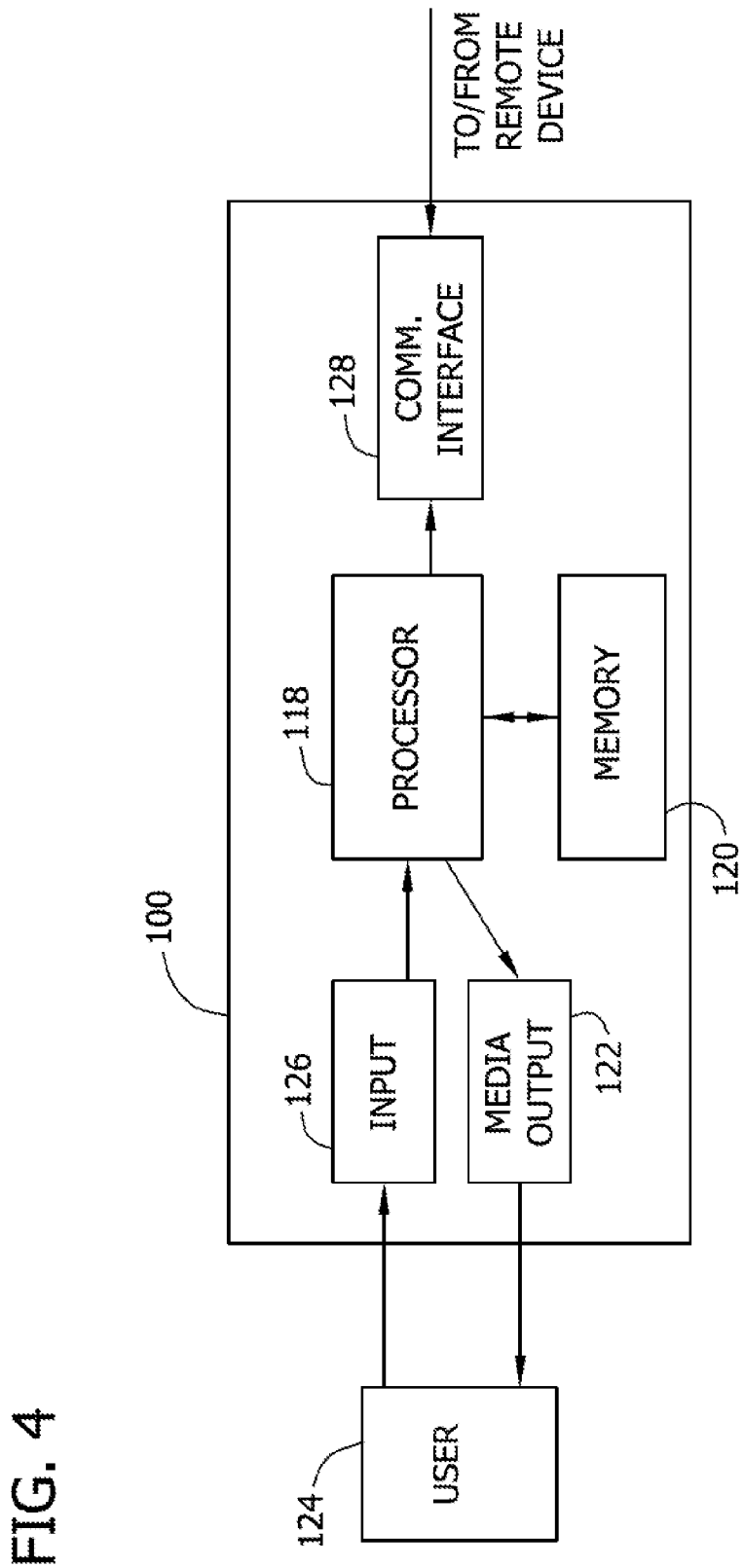
FIG. 4 is a block diagram of an exemplary user computing device that may be used with the condition monitoring system shown in FIG. 2.

FIG. 4 is a block diagram of user computing device 100. In the exemplary embodiment, user computing device 100 includes a processor 118 for executing instructions. In some embodiments, executable instructions are stored in a memory area 120. Processor 118 may include one or more processing units (e.g., in a multi-core configuration). Memory area 120 is any device allowing information, such as executable instructions and/or other data, to be stored and retrieved.

User computing device 100 also includes at least one media output component 122 for use in presenting information to a user 124. Media output component 122 is any component capable of conveying information to user 124. Media output component 122 may include, without limitation, a display device (e.g., a liquid crystal display (LCD), an organic light emitting diode (OLED) display, or an audio output device (e.g., a speaker or headphones).

In some embodiments, user computing device 100 includes an input device 126 for receiving input from user 124. Input device 126 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of media output component 122 and input device 126. User computing device 100 also includes a communication interface 116, which is communicatively coupled to network 102 and/or control system 22.

In the exemplary embodiment, the power output of power generation system 10 is approximately equal to the sum of the power output of gas turbine engine 12 and the power output of steam turbine 14. During operation of power generation system 10 in low forward power mode, steam valves 80 are closed such that a power output of power generation system 10 is approximately equal to a power output of gas turbine engine 12 and any power output from steam turbine 14 due to steam leakage through steam valves 80. Control system 22 determines a power output attributable to steam leakage through steam valves 80 by calculating a fuel consumption of gas turbine engine 12 with power generation system 10 in low forward power mode. In the exemplary embodiment, control system 22 receives signals indicative of a fuel consumption of gas turbine engine 12 from fuel sensor 40. Control system 22 calculates a condition of steam turbine 14 based at least in part on the sensed fuel consumption of gas turbine engine 12. In addition, control system 22 determines the steam leakage through steam valves 80 to be greater than an acceptable steam leakage if the fuel consumption of gas turbine engine 12 is less than a predefined fuel consumption with power generation system 10 in low forward power mode.

In the exemplary embodiment, control system 22 receives signals indicative of the fuel consumption of gas turbine engine 12 with power generation system 10 in low forward power mode. Control system 22 will determine that the condition of steam turbine 14 is less than a predefined steam turbine condition if the sensed fuel consumption of gas turbine engine 12 is different than a predefined fuel consumption of gas turbine engine 12. In one embodiment, control system 22 will determine the condition of steam turbine 14 is less than a predefined steam turbine condition if the sensed fuel consumption of gas turbine engine 12 is less than a predefined fuel consumption of gas turbine engine 12.

In one embodiment, control system 22 calculates an operating power output of gas turbine engine 12 based at least in part on the sensed fuel consumption of gas turbine engine 12. In such an embodiment, control system 22 will determine the condition of steam turbine 14 is less than a predefined steam turbine condition if the calculated operating power output of gas turbine engine 12 is less than the calculated baseline power output of gas turbine engine 12.

In the exemplary embodiment, control system 22 calculates a baseline power output of gas turbine engine 12 based at least in part on a predefined power output of power generation system 10 and a predefined power output of steam turbine 14. Control system 22 also calculates the fuel consumption of gas turbine engine 12 based at least in part on the calculated baseline power output of gas turbine engine 12. Control system 22 will determine the condition of steam turbine 14 to be less than a predefined steam turbine condition if the sensed fuel consumption of gas turbine engine 12 is less than the calculated fuel consumption of gas turbine engine 12.

In one embodiment, control system 22 calculates the compressor drag 48 of rotor assembly 42 at a predefined overspeed value with gas turbine engine 12 operated in off-line mode. Control system 22 also calculates a power output of gas turbine engine 12 that is indicative of compressor drag 48 at the predefined overspeed value. In such an embodiment, control system 22 calculates a baseline power output of steam turbine 14 based at least in part on the calculated compressor drag 48. In addition, control system 22 calculates the baseline power output of gas turbine engine 12 based at least in part on the calculated baseline power output of steam turbine 14 and the power output of power generation system 10 in the low forward power mode. Control system 22 also calculates a fuel consumption associated with the calculated baseline power output of gas turbine engine 12, and determines the condition of steam turbine 14 to be less than a predefined steam turbine condition if the sensed fuel consumption of gas turbine engine 12 is less than the calculated fuel consumption of gas turbine engine 12.

In another embodiment, control system 22 calculates a maximum power output of HP turbine assembly 70 based at least in part on the predefined overspeed value of rotor assembly 42. Control system 22 also calculates a maximum power output of LP turbine assembly 74 based at least in part on the predefined overspeed value of rotor assembly 42. In addition, control system 22 calculates a power output of IP turbine assembly 72 based at least in part on the calculated HP turbine assembly 70 power output, the calculated LP turbine assembly 74 power output, and the calculated gas turbine engine 12 power output indicative of compressor drag 48. Control system 22 also calculates a baseline power output of steam turbine 14 based at least in part on the calculated power output of IP turbine assembly 72. In this embodiment, control system 22 calculates the baseline power output of gas turbine engine 12 based at least in part on the calculated baseline power output of steam turbine 14 and the power output of power generation system 10 in the low forward power mode. Control system 22 also calculates a fuel consumption based on the calculated baseline power output of gas turbine engine 12, and determines the condition of steam turbine 14 to be less than a predefined steam turbine condition if the sensed fuel consumption of gas turbine engine 12 is less than the calculated fuel consumption of gas turbine engine 12.

The use of control system 22 to determine the amount of steam leakage through steam turbine 14 based on the fuel consumption of gas turbine engine 12 facilitates testing whether steam valves 80 are functioning within acceptable steam leakage limits without shutting down steam turbine 14. For example, in the exemplary embodiment, when power generation system 10 is in low forward power mode, control system 22 will determine a steam leakage through steam valves 80 if the sensed power output of gas turbine engine 12 is less than the expected power output, which is indicative of a power contribution from steam turbine 14 caused by leakage through steam valves 80. Moreover, because control system 22 determines an operating condition of steam valves 80 with power generation system 10 online, a manual inspection of steam valves 80 may not be required.

FIG. 5 is a flow chart illustrating an exemplary method 200 for use in monitoring a condition of power generation system 10. In the exemplary embodiment, method 200 includes calculating 202 the power output of gas turbine engine 12 based at least in part on a predefined power output of power generation system 10 and a predefined power output of steam turbine 14. Power generation system 10 is operated 204 to generate a power output that is approximately equal to the predefined power generation system power output with steam turbine 14 off-line. Sensor transmits 206 to control system 22 a signal that is indicative of an operating power output of gas turbine engine 12. Control system 22 will determine 208 a condition of steam turbine 14 based at least in part on the sensed operating gas turbine engine power output and the calculated gas turbine engine power output.

In one embodiment, control system 22 will determine the condition of steam turbine 14 to be less than a predefined steam turbine condition if the sensed operating gas turbine engine power output is less than the calculated gas turbine engine power output.

In the exemplary embodiment, method 200 also includes calculating 210 a fuel consumption value of gas turbine engine 12 based at least in part on the calculated gas turbine engine power output. Sensor 114 transmits 212 to control system 22 a signal indicative of an operating fuel consumption of gas turbine engine 12. Control system 22 will determine 214 that the condition of steam turbine 14 to be less than a predefined steam turbine condition if the sensed operating fuel consumption of gas turbine engine 12 is less than the calculated fuel consumption of gas turbine engine 12.

In one embodiment, control system 22 calculates a baseline power output of steam turbine 14 based at least in part on an overspeed value of power generation system 10. In such an embodiment, control system 22 calculates a power output of gas turbine engine 12 based at least in part on the predefined power generation system power output and the calculated baseline steam turbine power output.

In another embodiment, control system 22 calculates compressor drag 48 based at least in part on the overspeed value and with gas turbine engine 12 off-line. In such an embodiment, control system 22 calculates the baseline steam turbine power output based at least in part on the calculated compressor drag.

In one embodiment, control system 22 calculates a power output of gas turbine engine 12 that is indicative of compressor drag 48 at overspeed. Control system 22 also calculates a maximum power output of HP turbine assembly 70 based at least in part on the overspeed value, and calculates a maximum power output of LP turbine assembly 74 based at least in part on the overspeed value. In addition, control system 22 calculates a power output of IP turbine assembly 72 based at least in part on the calculated HP turbine assembly power output, the calculated LP turbine assembly power output, and the calculated gas turbine engine power output indicative of compressor drag 48. In such an embodiment, the calculated IP turbine assembly power output is indicative of an allowable leakage through steam turbine 14.

The above-described systems and methods overcome at least some disadvantages of known testing systems by providing a condition monitoring system that facilitates monitoring steam leakage through the steam turbine by monitoring the fuel consumption of a gas turbine engine. As such, the steam turbine is not required to be removed from service and/or dismantled to determine if the steam turbine operates within acceptable steam leakage values, thereby reducing the costs of operating the steam turbine and extending the operational life of a power generation system.

An exemplary technical effect of the methods, system, and apparatus described herein includes at least one of: (a) calculating, by a control system, a gas turbine engine power output based at least in part on a predefined power generation system power output and a predefined baseline steam turbine power output; (b) operating the power generation system to generate a power output that is approximately equal to the predefined power generation system power output with the steam turbine off-line; (c) transmitting, from a sensor to the control system, a signal indicative of an operating power output of the gas turbine engine; and (d) determining a condition of the steam turbine based at least in part on the sensed operating gas turbine engine power output and the calculated gas turbine engine power output.

Exemplary embodiments of a power generation system and methods for monitoring operation of same are described above in detail. The systems and methods are not limited to the specific embodiments described herein, but rather, components of the systems and/or steps of the methods may be utilized independently and separately from other components and/or steps described herein. For example, the methods may also be used in combination with other power generation monitoring systems, and are not limited to practice with only the power generation system as described herein. Rather, the exemplary embodiment can be implemented and utilized in connection with many other power generation system monitoring applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of monitoring a power generation system that includes a steam turbine coupled to a gas turbine engine, said method comprising:
    calculating, by a control system, a gas turbine engine power output based at least in part on a predefined power generation system power output and a predefined steam turbine power output;
    operating the power generation system to generate a power output that is approximately equal to the predefined power generation system power output, wherein the power output of the power generation system is generated when steam valves associated with the steam turbine are in a closed position;
    transmitting, from a sensor to the control system, a signal indicative of a sensed operating power output of the gas turbine engine; and
    determining a condition of the steam turbine, wherein the condition is steam leakage through the steam valves towards the steam turbine, the condition being determined when the sensed operating power output of the gas turbine engine is less than the calculated gas turbine engine power output.

2. A method in accordance with claim 1, further comprising determining the condition of the steam turbine to be more than a predefined steam turbine condition threshold if the sensed operating gas turbine engine power output is less than the calculated gas turbine engine output.

3. A method in accordance with claim 1, further comprising:
    calculating a gas turbine engine fuel consumption value based at least in part on the calculated gas turbine engine power output;
    transmitting, from the sensor to the control system, a signal indicative of an operating fuel consumption of the gas turbine engine; and
    determining if the condition of the steam turbine is less than a predefined steam turbine condition threshold based at least in part on the operating fuel consumption of the gas turbine engine.

4. A method in accordance with claim 1, further comprising:
    calculating a steam turbine power output based at least in part on an overspeed value of the power generation system; and
    calculating a gas turbine engine power output based at least in part on the predefined power generation system output and the calculated steam turbine power output.

5. A method in accordance with claim 4, wherein the gas turbine engine includes a compressor, said calculating the steam turbine output comprises:
    calculating a compressor drag based at least in part on the overspeed value; and
    calculating the steam turbine power output based at least in part on the calculated compressor drag.

6. A method in accordance with claim 5, wherein the calculated steam turbine power output is indicative of an allowable leakage through the steam valves and channeled towards the steam turbine.

7. A method in accordance with claim 5, wherein the steam turbine includes a high pressure (HP) turbine, an intermediate pressure (IP) turbine, and a lower pressure (LP) turbine, said method further comprises:
    calculating the gas turbine engine power output indicative of a compressor drag at overspeed;
    calculating a maximum power output of the HP turbine based at least in part on the overspeed value;
    calculating a maximum power output of the LP turbine based at least in part on the overspeed value; and
    calculating a power output of the IP turbine based at least in part on the calculated HP turbine power output, the calculated LP turbine power output, and the calculated gas turbine engine power output indicative of the compressor drag, wherein the calculated IP turbine power output is indicative of an allowable leakage through the steam turbine.

8. A condition monitoring system for use with a power generation system that includes a steam turbine coupled to a gas turbine engine, said condition monitoring system comprising:
    at least one fuel sensor configured to sense a fuel consumption of the gas turbine engine; and
    a control system coupled to said at least one fuel sensor, said control system configured to:
        compare the sensed fuel consumption of the gas turbine engine to a predefined fuel consumption threshold; and
        determine a condition of the steam turbine when the sensed fuel consumption is less than the predefined fuel consumption threshold, wherein the condition is steam leakage through steam valves in a closed position associated with the steam turbine.

9. A condition monitoring system in accordance with claim 8, wherein said control system is configured to:
    calculate a baseline gas turbine engine power output based at least in part on a predefined power generation system power output and a predefined baseline steam turbine power output; and
    calculate the condition of the steam turbine based at least in part on the calculated baseline gas turbine engine power output and the sensed fuel consumption of the gas turbine engine.

10. A condition monitoring system in accordance with claim 9, wherein said control system is further configured to:
calculate an operating power output of the gas turbine engine based at least in part on the sensed fuel consumption; and
determine if the condition of the steam turbine is less than a predefined steam turbine condition threshold based at least in part on the calculated operating gas turbine engine power output and the calculated baseline gas turbine engine power output.

11. A condition monitoring system in accordance with claim 9, wherein said control system is further configured to:
calculate a gas turbine engine fuel consumption value based at least in part on the calculated baseline gas turbine engine power output; and
determine if the condition of the steam turbine is less than a predefined steam turbine condition based at least in part on the sensed fuel consumption and the calculated fuel consumption value.

12. A condition monitoring system in accordance with claim 9, wherein said control system is further configured to:
calculate a steam turbine power output based at least in part on an overspeed value of the power generation system; and
calculate the baseline gas turbine engine power output based at least in part on the predefined power generation system output and the calculated steam turbine power output.

13. A condition monitoring system in accordance with claim 9, wherein the gas turbine engine includes a compressor, said control system is further configured to:
calculate a compressor drag based at least in part on an overspeed value of the power generation system;
calculate a steam turbine power output based at least in part on the calculated compressor drag; and
calculate the baseline gas turbine engine power output based at least in part on the predefined power generation system output and the calculated steam turbine power output.

14. A condition monitoring system in accordance with claim 13, wherein the calculated steam turbine output is indicative of an allowable steam leakage through the steam valves and channeled towards the steam turbine.

15. A condition monitoring system in accordance with claim 13, wherein the steam turbine includes a high pressure (HP) turbine, an intermediate pressure (IP) turbine, and a lower pressure (LP) turbine, said control system is configured to:
calculate the gas turbine engine power output based at least in part on the calculated compressor drag;
calculate a maximum power output of the HP turbine based at least in part on the overspeed value;
calculate a maximum power output of the LP turbine based at least in part on the overspeed value; and
calculate a power output of the IP turbine based at least in part on the calculated HP turbine power output, the calculated LP turbine power output, and the calculated gas turbine engine power output, wherein the calculated IP turbine power output is indicative of an allowable steam leakage through the steam valves and channeled towards the steam turbine.

16. A power generation system comprising:
a gas turbine engine;
a steam turbine coupled to said gas turbine engine;
at least one fuel sensor configured to sense a fuel consumption of said gas turbine engine; and
a control system coupled to said at least one fuel sensor for use in determining a condition of the steam turbine, wherein the condition is steam leakage through steam valves in a closed position associated with said steam turbine when the sensed fuel consumption of said gas turbine engine is less than a predefined fuel consumption threshold.

17. A power generation system in accordance with claim 16, wherein said control system is configured to:
calculate a baseline gas turbine engine power output based at least in part on a predefined power generation system power output and a predefined baseline steam turbine power output; and
calculate the condition of said steam turbine based at least in part on the calculated baseline gas turbine engine power output and the sensed fuel consumption of said gas turbine engine.

18. A power generation system in accordance with claim 17, wherein said control system is further configured to:
calculate an operating power output of said gas turbine engine based at least in part on the sensed fuel consumption; and
determine if the condition of said steam turbine is less than a predefined steam turbine condition threshold based at least in part on the calculated operating gas turbine engine power output and the calculated baseline gas turbine engine power output.

19. A power generation system in accordance with claim 17, wherein said gas turbine engine includes a compressor, said control system is further configured to:
calculate a compressor drag based at least in part on an overspeed value of said power generation system;
calculate the steam turbine power output based at least in part on the calculated compressor drag; and
calculate the baseline gas turbine engine power output based at least in part on the predefined power generation system output and the calculated steam turbine power output, wherein the calculated steam turbine output is indicative of an allowable steam leakage through the steam turbine.

20. A power generation system in accordance with claim 19, wherein said steam turbine includes a high pressure (HP) turbine, an intermediate pressure (IP) turbine, and a lower pressure (LP) turbine, said control system is configured to:
calculate the gas turbine engine power output based at least in part on the calculated compressor drag;
calculate a maximum power output of said HP turbine based at least in part on the overspeed value;
calculate a maximum power output of said LP turbine based at least in part on the overspeed value; and
calculate a power output of said IP turbine based at least in part on the calculated HP turbine power output, the calculated LP turbine power output, and the calculated gas turbine engine power output, wherein the calculated IP turbine power output is indicative of an allowable steam leakage through said steam turbine.

* * * * *

UNITED STATES PATENT AND TRADEMARK OFFICE
CERTIFICATE OF CORRECTION

| | | |
|---|---|---|
| PATENT NO. | : 9,003,809 B2 | Page 1 of 1 |
| APPLICATION NO. | : 13/024014 | |
| DATED | : April 14, 2015 | |
| INVENTOR(S) | : Johnson et al. | |

It is certified that error appears in the above-identified patent and that said Letters Patent is hereby corrected as shown below:

In the specification

In Column 5, Line 56, delete "(IEEM 802.11" and insert -- (IEEE®) 802.11 --, therefor.

Signed and Sealed this
Twentieth Day of October, 2015

Michelle K. Lee
*Director of the United States Patent and Trademark Office*